Feb. 17, 1925.  1,526,917
J. L. LELAND
METHOD OF MAKING SPIRAL TURBINE CASINGS
Filed July 30, 1923    2 Sheets-Sheet 1

Inventor
John Laurence Leland
Thurston Knost Hudson
Attorneys

Feb. 17, 1925.
J. L. LELAND
1,526,917
METHOD OF MAKING SPIRAL TURBINE CASINGS
Filed July 30, 1923   2 Sheets-Sheet 2
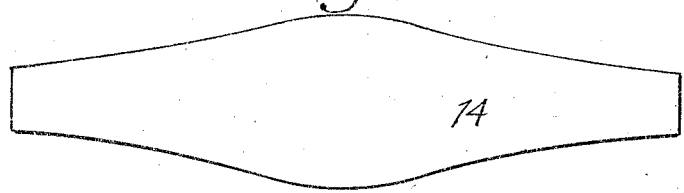
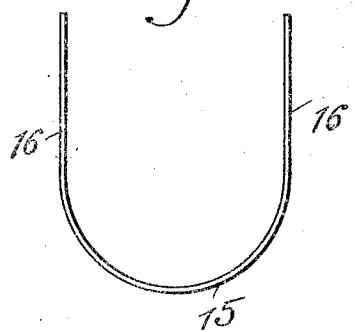
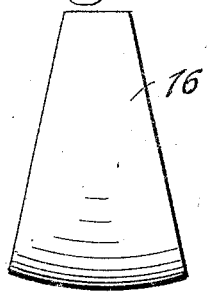
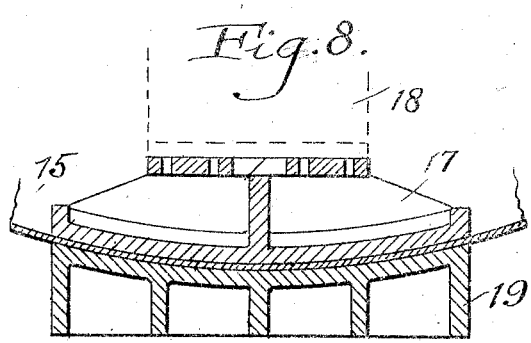
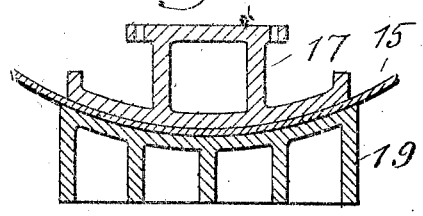
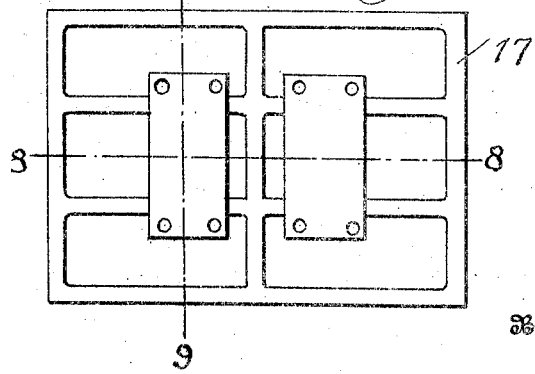
Inventor
John Laurence Leland
Thurston Kwist Hudson
By
Attorneys Patented Feb. 17, 1925.

1,526,917

UNITED STATES PATENT OFFICE.

JOHN LAURENCE LELAND, OF CLEVELAND, OHIO, ASSIGNOR, BY MESNE ASSIGNMENTS, TO NEWPORT NEWS SHIPBUILDING & DRY DOCK COMPANY, OF NEWPORT NEWS, VIRGINIA, A CORPORATION OF VIRGINIA.

METHOD OF MAKING SPIRAL TURBINE CASINGS.

Application filed July 30, 1923. Serial No. 654,508.

*To all whom it may concern:*

Be it known that I, JOHN LAURENCE LELAND, a citizen of the United States, residing at Cleveland, in the county of Cuyahoga and State of Ohio, have invented a certain new and useful Improvement in Methods of Making Spiral Turbine Casings, of which the following is a full, clear, and exact description.

This invention relates to a method of forming a steel plate spiral casing for turbines, and has for its object to provide a practical method of forming a steel plate spiral casing in which the curvature in radial planes is substantially circular, the diameter increasing toward the inlet and in which the general outline approximates as closely as possible a true spiral.

Prior to the present invention all steel plate spiral turbine casings have been constructed by the so-called "straight line" method, in which the blanks for short sections of the casing have been cut to proper shape and rolled to the proper radius for the portion of the casing formed thereby, each section having a straight outer portion which is substantially cylindrical. The plates are then flanged along their edges to fit the edges of adjacent sections and the speed ring at the interior of the casing, the sections being riveted together along their edges and to the inner speed ring. A casing formed by a "straight line" method is not a true spiral but a many sided figure of general spiral form.

A true spiral casing is superior to the casing made by the "straight line" method in that it possesses superior strength and permits more efficient flow of water without eddies or losses. Furthermore, by forming the sections to the true spiral curvature the sections may be fitted together without flanging the edges thereof.

Figure 1:
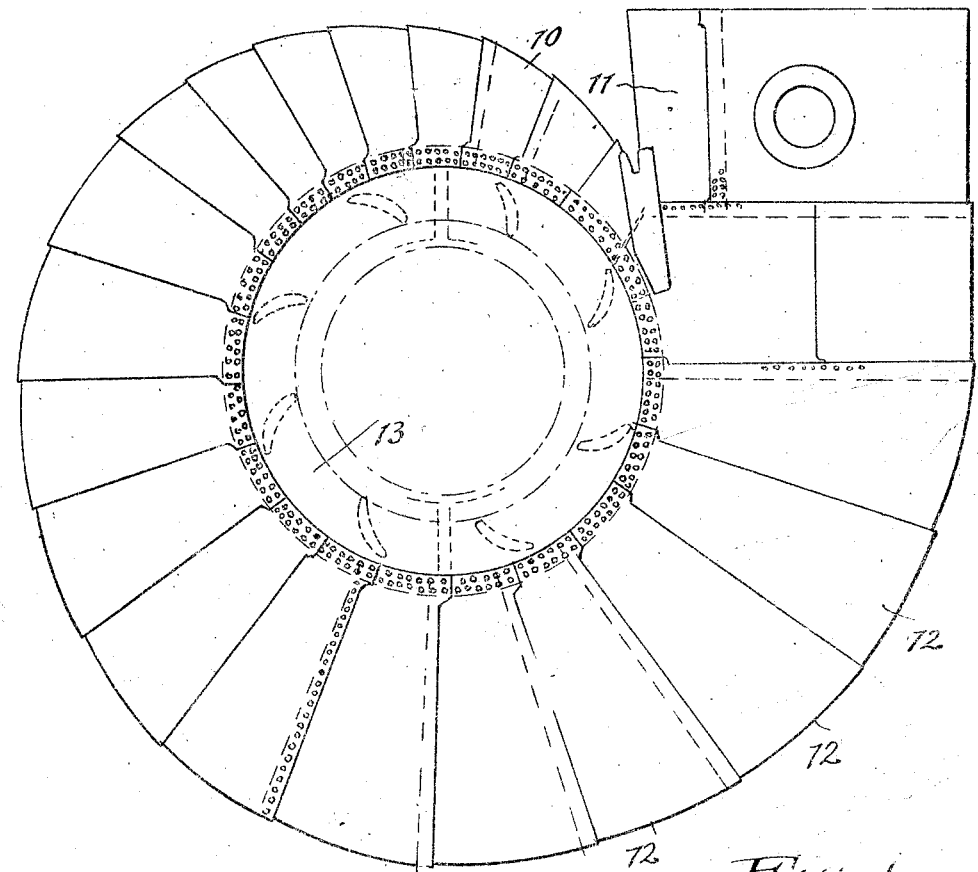
Figure 2:
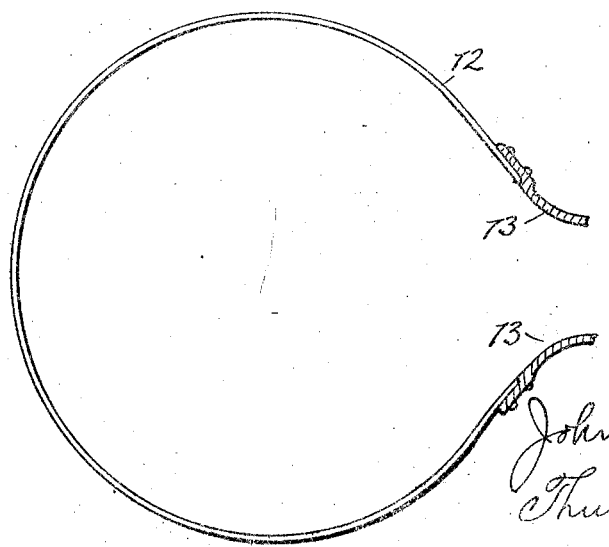

Reference should be had to the accompanying drawings forming a part of this specification in which Figure 1 is a top plan view of a spiral casing constructed in accordance with the present invention; Fig. 2 is a section through a portion of the casing taken in a radial plane; Fig. 3 is a plan view of the blank from which one of the casing sections is formed; Fig. 4 is an end elevation of the blank after the initial operation by which the blank is bent to U-form; Fig. 5 is a side elevation of the U-blank shown in Fig. 4; Fig. 6 is a side elevation of the blank after the same has been shaped to provide the proper transverse curvature; Fig. 7 is a top plan view of the upper die used to impart the proper transverse curvature to the blank; Fig. 8 is a longitudinal vertical section through the upper and lower die taken on line 8—8 of Fig. 7; and Fig. 9 is a transverse vertical section through the dies taken on the line 9—9 of Fig. 7.

Referring to the accompanying drawings, the spiral casing 10 shown in Fig. 1 is provided with an inlet 11, circular in cross-section, and has its body portion formed of relatively short sections 12 which are secured together with their edges overlapping, and to central circular speed rings 13, the sections 12 being circular in radial cross-section and gradually decreasing in diameter around the speed ring from the inlet end, and the sections being so formed that the casing approximates a true spiral shape.

Referring to Figs. 3 to 6 of the drawing, the short sections employed in building up the casing are formed from flat elongated blanks 14 which are wider at the center and taper toward both ends as shown in Fig. 3. These flat blanks are first passed through suitable bending rolls which bend the blank into U-form as shown in Figs. 4 and 5, the bottom portion of the U being substantially semi-cylindrical but slightly conical from the end portions of the blank extending in substantially parallel planes from the rounded portion. After the blank has been bent to the shape shown in Figs. 4 and 5 it is placed in a press, the upper die 17 of which is bolted to the head 18 of a hydraulic press and the lower die 19 of which is secured to the bed of the press. The two dies 17 and 19 have transverse and longitudinal curvatures corresponding to the transverse and longitudinal curvatures of a portion of the spiral casing. The dies 17 and 19 engage a portion only of the curved bottom 15 of the blank and several strokes of the press are required to completely form a blank with the proper curvature to form a section of the complete spiral and for convenience this will be termed the spiral curvature. The bottom of the U-blank will be formed with the greatest spiral curvature, and this curvature will be gradually decreased toward the ends of the rounded portion where in the finished section the latter has a substantially cylindrical but slightly conical curvature only. The varying curvature in different portions of the blank is provided by varying the stroke of the press as different portions of the blank are fed between the dies.

The blank is first spirally curved at its lower portion by means of the dies, and after the blank has been formed with the proper curvature along its bottom, it will be turned first to one side and then the other, or moved endwise and subjected to successively shortened strokes to provide the decreasing curvature toward the ends of the substantially cylindrical portion.

In forming the next section, the operation above described will be repeated except that the initial stroke will be lighter so that the greatest spiral curvature of this section will be slightly less than the spiral curvature of the first section.

By varying the stroke of the press as above described, each section may be formed to the proper spiral curvature by means of one pair of dies and the same dies may be employed for a number of succeeding sections. It has been found in practice that with a few sets of dies formed to correspond to different parts of the casing, all the sections of the casing may be formed.

After the U-blanks have been provided with the proper spiral curvature as above described, the ends thereof are placed in suitable bending rolls and bent inwardly toward each other and at their inner ends a slight curvature is provided to fit the conical surface of the speed ring. The spiral casing formed by uniting the sections formed as above described has a continuous curvature throughout, which very closely approximates a true spiral, a construction which prior to the present invention has not been possible.

Having described my invention, I claim:

1. The method of forming successive transverse sections of a sectional steel plate spiral casing, which comprises blanking out the sections from flat stock, imparting a curvature thereto corresponding to the transverse curvature of the part of the casing which the sections are to form, and then imparting a transverse curvature to the blank corresponding accurately to the continuous spiral curvature of the casing.

2. The method of producing successive transverse sections of a sectional steel plate spiral casing, which comprises bending the sections to conform to part of the transverse curvature of the casing, then forming the sections so as to impart the spiral curvature, and then completing the formation of the transverse curvature corresponding accurately to the continuous spiral curvature of the casing.

3. The method of forming successive transverse sections of a sectional steel plate spiral casing which consists in blanking the sections from flat stock, and imparting thereto separately the curvatures corresponding to the transverse curvature of the casing and the continuous spiral curvature in the direction of flow.

4. The method of producing successive transverse sections of a sectional steel plate spiral casing which consists in blanking the spiral casing which consists in blanking the sections from flat stock, and giving the sections a curvature corresponding to the continuous spiral curvature of the casing by successively bending and forming portions of the blanks to varying curvatures.

5. The method of producing successive transverse sections of a steel plate spiral casing, which consists in blanking the sections from flat stock and forming the same by separate bending operations to the transverse and continuous spiral curvatures of the portion of the casing which the sections are to form.

6. The method of forming successive transverse sections of a steel plate spiral casing, which consists in blanking each of the sections from flat stock, imparting a curvature to a portion of the sections corresponding to the transverse curvature of the part of the casing which the sections are to form, and subsequently imparting to the sections a curvature corresponding to the continuous spiral curvatures of the casing.

7. The method of producing successive transverse sections of a steel plate spiral casing, which consists in blanking the sections from flat stock, bending a portion of each of the blanks to conical form, and forming the conical portions to a continuous spiral curvature while maintaining the curvature circular transversely of the spiral.

8. The method of shaping successive transverse sections of a steel plate spiral casing to a substantially true spiral curvature which consists in progressively bending and forming the blanks by separate operations upon successive portions of each of said blanks.

9. The method of shaping a section of a steel plate spiral casing which consists in blanking the section from flat stock, bending the blank to the transverse curvature of a part of the casing which the section is to form, and forming the blank progressively by successive operations upon adjacent portions thereof to the spiral curvature of the casing while maintaining the transverse curvature.

10. The method of forming successive transverse sections of a steel plate spiral casing, which consists in cutting elongated blanks from flat stock, forming the central portion of the blanks by successive bending operations to the transverse and spiral curvatures of the part of the casing which the sections are to form, and then shaping the ends of the sections to conform to the transverse shape of the central portions of the casing.

11. The method of forming successive transverse sections of a steel plate spiral casing, which consists in cutting elongated blanks from flat stock, bending the blanks to U-shape with the curvature at the bottom of the U corresponding to the transverse curvature of a part of the casing, imparting to the curved portion of the blanks a spiral curvature in a direction at right angles to the first curvature, and then shaping the ends of the U to conform to the transverse shape of the central portions of the casing.

12. The method of shaping a section of a steel plate spiral casing which consists in blanking the section from flat stock, shaping a part of the blank to the transverse curvature of a part of the casing which the section is to form, and forming the spiral curvature by subjecting portions of the blank progressively to pressure in a press having dies formed with transverse and longitudinal curvatures and varying the stroke of the press to vary the curvature in parts of the blank.

13. The method of forming the sections of a steel plate spiral casing which consists in blanking out the sections from flat stock, bending each blank to substantially U-shape with the bottom of the U slightly conical in form, imparting a curvature across the bottom portion of the U-shaped blank corresponding substantially to the curve of the spiral at the portion of the casing at which the section is to be placed by shaping successive portions of the curved part of the U-blank in a press between dies formed with coacting faces curved to correspond to both the transverse and spiral curvatures of a portion of the spiral casing, and varying the stroke of the press to provide a gradually decreasing spiral curvature from the bottom to the ends of the curved portion of the U, and bending the upper ends of the U inwardly toward each other to the transverse shape of the casing.

14. The method of forming sections of a steel plate spiral casing which consists in forming flat elongated blanks tapered from the center thereof toward both ends, bending each blank to substantially U-shape with the bottom of the U slightly conical in form, shaping successive portions of the curved portion of each U-blank in a press having dies with co-operating faces curved to correspond to the curvatures of a portion of the spiral casing varying, the stroke of the press to provide gradually decreasing curvature from the bottom to the ends of the curved portion of the U and to impart varying curvatures to blanks forming successive sections of the casing, and curving the ends of the U blanks inwardly toward each other.

15. The method of forming a sheet metal spiral casing having a large number of sections each curved to correspond to the transverse and spiral curvatures of the casing, which comprises blanking out the sections to suitable outline, and imparting the spiral curvatures to the sections by a plurality of sets of dies, each set being utilized to impart the curvatures to a plurality of sections.

16. The method of shaping the sections of a sectional sheet metal spiral casing which consists in blanking out the sections to suitable outline, imparting a suitable slightly conical curvature to the middle portions of the different blanks, imparting spiral curvatures to the conically curved portions of a number of the blanks by a pair of dies, and varying the curvatures imparted to successive blanks by suitably varying the stroke of the press, whereby the different sections of the casing can be shaped using a relatively small number of dies.

17. The method of shaping the sections of a sectional sheet metal spiral casing for turbines which consists in blanking out the sections to suitable outline, imparting a slightly conical curvature to the middle portions of the blanks, imparting spiral curvatures to the conically curved portions of a number of the blanks by a pair of dies, and varying the curvatures imparted to successive blanks by suitably varying the stroke of the press whereby the sections of the casing can be shaped using a relatively small number of dies, and afterwards curving the ends of the blanks to complete the curvatures thereof to correspond to the cross-sectional curvatures of the casing progressively around the casing and to fit the speed rings of the casing.

In testimony whereof, I hereunto affix my signature.

JOHN LAURENCE LELAND.